United States Patent
Adler et al.

(10) Patent No.: US 10,979,648 B2
(45) Date of Patent: Apr. 13, 2021

(54) STEREOSCOPIC APPARATUS AND A METHOD FOR DETERMINING EXPOSURE TIME

(71) Applicant: INUITIVE LTD., Ra'anana (IL)

(72) Inventors: Gilad Adler, Herzliya (IL); Yaron Rashi, Hod Hasharon (IL)

(73) Assignee: INUITIVE LTD., Ra'anana (IL)

( * ) Notice: Subject to any disclaimer, the term of this patent is extended or adjusted under 35 U.S.C. 154(b) by 0 days.

(21) Appl. No.: 16/674,236

(22) Filed: Nov. 5, 2019

(65) Prior Publication Data
US 2020/0145572 A1    May 7, 2020

Related U.S. Application Data

(60) Provisional application No. 62/756,619, filed on Nov. 7, 2018.

(51) Int. Cl.
*H04N 5/235* (2006.01)
*H04N 13/239* (2018.01)

(52) U.S. Cl.
CPC ......... *H04N 5/2353* (2013.01); *H04N 13/239* (2018.05)

(58) Field of Classification Search
CPC ............... H04N 5/2353; H04N 13/296; H04N 2013/0081; H04N 13/239
See application file for complete search history.

(56) References Cited

U.S. PATENT DOCUMENTS

| | | | |
|---|---|---|---|
| 2014/0321712 A1* | 10/2014 | Ciurea | G06T 7/85 382/106 |
| 2015/0341620 A1* | 11/2015 | Han | H04N 13/257 701/37 |
| 2017/0095297 A1* | 4/2017 | Richmond | A61B 1/045 |

* cited by examiner

*Primary Examiner* — Tsion B Owens
(74) *Attorney, Agent, or Firm* — Browdy and Neimark, PLLC

(57) ABSTRACT

A method and a stereoscopic apparatus configured to determine an exposure time period for capturing images. The apparatus comprises at least one image capturing device for capturing pairs of images; a processor configured to: calculate a texture-signal-to-noise ratio (TSNR) metric based on information derived from a pair of captured images; calculate an image saturation metric based on that pair of captured images; calculate a value for an exposure duration that will be implemented by the at least one image capturing device when another pair of images are captured; provide the value of the calculated exposure time period to each at least one image capturing device; and wherein the at least one image capturing device is configured to capture at least one image of the target while implementing each the respective calculated value of the exposure time period provided to the corresponding one of the at least one image capturing device.

11 Claims, 4 Drawing Sheets

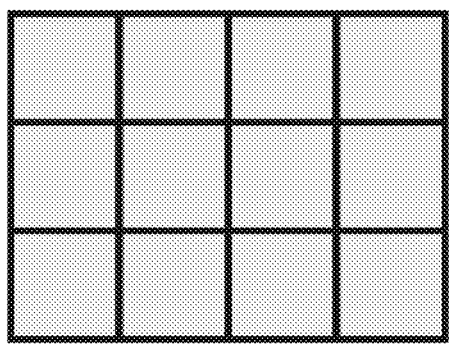
FIG. 3
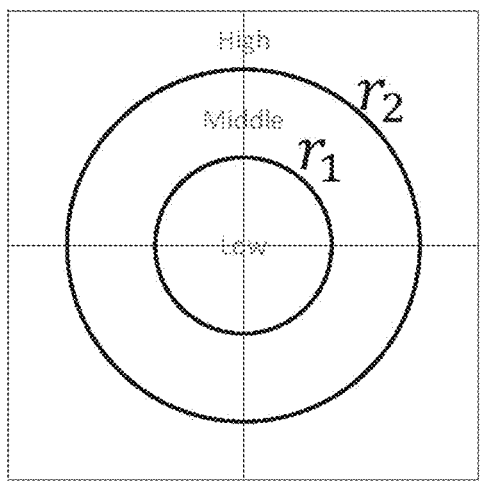
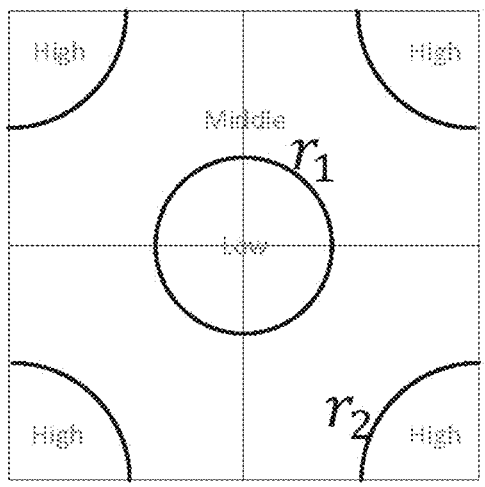
FIG. 4A  FIG. 4B
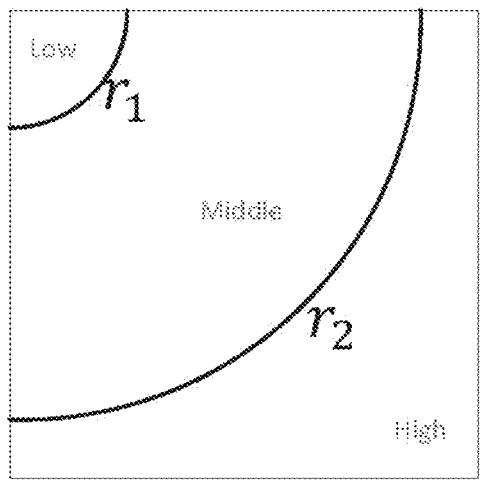
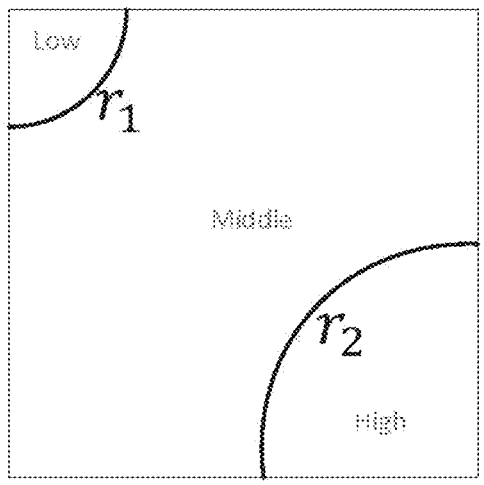
FIG. 5A  FIG. 5B

STEREOSCOPIC APPARATUS AND A METHOD FOR DETERMINING EXPOSURE TIME

TECHNICAL FIELD

The present disclosure generally relates to the field of optical devices, and more particularly, to automatic exposure control.

BACKGROUND

Automatic exposure is a process for dynamically setting acquisition time according to the pixel intensity values associated with one or more recently acquired images. Specifically, in machine vision applications, the purpose of automatic exposure is to improve the quality of acquired images and, in turn, to improve certain performance aspects of the machine vision application using the acquired images. Automatic exposure often improves the accuracy, robustness, reliability, speed, and/or usability of the machine vision application and indeed traditional automatic exposure techniques include various methods for performing automatic exposure.

The target of automatic exposure control algorithm for a stereoscopy depth sensing system is to select an exposure duration which would optimize the depth estimation quality. Real world scenes may have conflicting requirements—some regions may require a long exposure while others may require a short exposure. The right exposure duration should be selected for each scene, while balancing these requirements.

Since a camera is typically not a stationary device, the captured scene may constantly be changed and hence its control must also rapidly follow the changes that occur, while still maintaining the required stability.

A stereoscopy-based depth acquiring device (e.g. a camera) uses two imaging sensors in order to retrieve a depth map. The left and right images are compared, and the depth calculating processor finds the best match that exists between each pixel belonging to the right image and a pixel belonging to the left image. The result is a disparity map which can be directly converted to depth.

A matching process may typically be carried out by examining pixels comprised within a neighborhood (group) of pixels around a target pixel in the left image and searching for a group of pixels in the right image that looks essentially the same. When the texture (or contrast) level within the pixel's neighborhood is low compared to the noise level, the matching process is likely to result in a wrong decision, and depth quality would consequently be compromised. In such cases, increasing the exposure duration can improve depth quality as texture-to-noise ratio is increased (noise is typically dominated by optical shot noise and thus texture-to-noise ratio increases when the sensor is exposed to more light). However, if the image, or parts thereof, become saturated, increasing the exposure time will not improve depth quality as the texture level will not increase. Moreover, in such a case, increasing the exposure time might even harm the depth quality.

In addition, increasing the exposure time, leads to an increase in the power consumption (especially in systems having an active light emitting projector) and motion blur. Thus, as will be appreciated by those skilled in the art, there is a clear incentive to maintain the exposure time as low as possible.

The problem of automatic exposure for stereoscopic depth determining systems is typically addressed in the art by reusing autoexposure concepts that are known from 2D photography which are applicable for human vision purposes. Automatic exposure control that is adequate for human vision purposes, typically aims to capture an image with a correct level of brightness (i.e. not too bright and not too dark). In other words, such an automatic exposure control aims to bring the average or median pixel intensity to a certain target level. In order to do that, the autoexposure mechanism uses a light meter which measures the total light intensity before taking the picture, and calculates therefrom the required exposure time. In other cases (especially in cases that video cameras are used), the autoexposure mechanism analyzes the average or median pixel levels in past frames and calculates the exposure time that would be required for future frames.

However, the "brightness" criteria that is used for such visual photography is not optimal for stereoscopic depth sensing performed by machines. The average brightness (or intensity level) of an image can be high while the texture level may still be too low compared to the noise level. For example, a white wall with a low contrast pattern can exhibit a relatively high average intensity level even under low light conditions, yet the texture-to-noise level might still be too low for depth extraction.

SUMMARY OF THE DISCLOSURE

The disclosure may be summarized by referring to the appended claims.

It is an object of the present disclosure to provide a novel solution that unlike existing autoexposure solutions which are optimized for the human vision, the present solution enables direct optimization of depth quality in stereoscopy-based depth sensing camera systems.

It is another object of the present disclosure to provide a solution that enables using texture-to-noise-ratio (or contrast-to-noise-ratio) as a metric for determining autoexposure for depth quality in stereoscopy-based camera systems.

It is another object of the present disclosure to provide a method and an apparatus implementing a control loop to enable merging both saturation and TSNR (i.e. texture-signal-to-noise-ratio) metrics.

It is another object of the present disclosure to provide a solution for implementing texture-to-noise-ratio estimators that are based on spectral methods and/or variance-to-mean methods.

It is another object of the present disclosure to enable division of an image into blocks for block-TSNR calculation, and calculating a full image TSNR based on the plurality of the blocks to which the image has been divided. When the image is divided into small blocks, each such block tends to be more homogenous, which in turn improves correlation of TSNR with the quality of the calculated depth.

It is another object of the present disclosure to provide a mechanism that enables applying a separate handling of block level saturation and image level saturation, as well as a saturation prediction method, which in turn enables achieving smooth and stable saturation control rather than experiencing an abrupt saturation control behavior.

Other objects of the present invention will become apparent from the following description.

The present disclosure relates to a stereoscopy-based depth camera apparatus and a method for enabling performing an automatic exposure control thereof, that achieves an enhanced level of depth quality, while minimizing the exposure duration and while limiting image over-exposure.

Depth quality in stereoscopy depends directly on the amount of texture and noise in the captured images. Texture is any edge, contour, or other high spatial information such as a projected pattern that can provide good matching between the left and right images. The proposed solution enables estimating the local and global texture signal to noise ratio. This according to the present invention enables in turn to implement an automatic exposure control algorithm based on an estimator that is able to achieve a required depth quality with a minimal required exposure, thereby reducing motion blur and power consumption (especially in a case that an assistive projected pattern is used, as often is the case when using such stereoscopic devices).

Thus, according to a first embodiment of the disclosure, there is provided a stereoscopic apparatus configured to determine duration of an exposure time period for capturing images by the stereoscopic apparatus and comprising:

at least one image capturing device configured to capture at least one pair of images;

one or more processors configured to:
calculate a texture-signal-to-noise ratio (TSNR) metric based on information derived from at least one image from among the pair of captured images, wherein the TSNR metric is proportional to a texture of the at least one image and inversely proportional to a noise associated with the at least one image, and wherein the TSNR metric is calculated based on unsaturated pixel blocks that belong to the at least one image;
calculate an image saturation metric based on the at least one image of the pair of captured images;
calculate one or more values for an exposure duration to be implemented by the at least one image capturing device when another pair of images are captured;
provide the calculated exposure duration value to each of the at least one image capturing devices; and wherein the at least one image capturing device is configured to capture another pair of images while each implementing a respective calculated exposure duration value provided to the corresponding one of the at least one image capturing device.

The term "stereoscopic" (or "stereo") as used herein throughout the specification and claims, is used typically to denote a combination derived from two or more images, that are either taken (preferably essentially simultaneously) by two or more different image capturing means, or from two or more images taken by a single image capturing means at different times, which are combined to produce a three dimensional depth image. It should be understood that even though the following description relates primarily to an apparatus that comprises two different image capturing devices, still the scope of the present invention is not restricted in any way to deriving a stereoscopic image from two sources, but also encompasses generating an image derived from one, three or more image capturing means.

The terms "image" and "image capturing device" as used herein throughout the specification and claims, are used to denote a visual perception being depicted or recorded by an artifact (a device), including but not limited to, a two dimensional picture, a video stream, a frame belonging to a video stream, and the like.

The terms "scene" or "target" as the case may be, are used interchangeably herein throughout the specification and claims to denote whatever is found within the field of view of the image capturing devices, e.g. a plurality of different objects.

The terms "exposure time", "exposure duration" or "exposure time period" as the case may be, are used interchangeably herein throughout the specification and claims to denote a period of time during which an image is taken by the image capturing devices.

The term "processor" as used herein throughout the specification and claims is used to denote a logic circuitry that responds to and processes basic instructions that enable executing a program that drives a device associated with the processor. The term encompasses a microprocessor, an application-specific instruction set processor (ASIP), a graphics processing unit (GPU), a digital signal processor (DSP), an image processor, image processing engine, also called media processor, an Application-Specific Integrated Circuit (ASIC), and the like.

According to another embodiment, the stereoscopic apparatus further comprises an automatic exposure control loop configured to implement a minimal exposure time period that enables capturing images having a pre-defined TSNR value.

By yet another embodiment the stereoscopic apparatus further comprises a user interface configured to receive an indication regarding the pre-defined TSNR value as selected by a user;

wherein the at least one processor is further configured to calculate a value for a minimal exposure time that would yield that pre-defined TSNR value, and provide the value of that minimal exposure time to the automatic exposure control loop; and wherein the automatic exposure control loop is configured to implement the calculated minimal exposure time that meets the pre-defined TSNR value as selected by the user.

In accordance with another embodiment, the automatic exposure control loop of the stereoscopic apparatus is further configured to enable tracking changes that occur due to a movement of the stereoscopic apparatus or changes in the scene, while maintaining depth image stability.

According to another embodiment, the at least one processor is configured to provide the auto exposure control loop with updated information that is based upon updated calculations of said TSNR metric and said image saturation metric.

By still another embodiment, the at least one processor is configured to determine at least one predefined Region of Interest (ROI), for which the at least one processor's calculation be carried out.

According to another aspect of the present disclosure, there is provided a method for determining an exposure time period for capturing images by a stereoscopic apparatus that comprises at least one image capturing device configured to capture pairs of images, wherein the method comprises the steps:

calculating a texture-signal-to-noise ratio (TSNR) metric based on information derived from at least one image belonging to a pair of captured images, wherein the TSNR metric is proportional to texture of at least one image from among the pair of captured images and inversely proportional to a noise associated with that at least one image, and wherein the TSNR metric is calculated based on unsaturated pixels that belong to the at least one image of the pair of captured images;

calculating an image saturation metric based on the at least one image of the pair of captured images;

calculating one or more values of a time exposure period that will be implemented by the at least one image capturing device when at least one other image is captured;

providing the calculated value of the time exposure period to each of the at least one image capturing device; and capturing at least one other image by the at least one image capturing device, while the at least one image capturing device implements the respective calculated value of the time exposure period provided to the corresponding one of the at least one image capturing device.

In accordance with another embodiment, the method provided further comprises a step of determining a minimal exposure time that enables capturing images having a pre-defined TSNR value.

By yet another embodiment, the method further comprising the steps of:

receiving an indication from a user regarding a selected pre-defined TSNR value;

calculating a minimal exposure time that would yield the pre-defined TSNR value; and implementing the calculated minimal exposure time that meets the pre-defined TSNR value as selected by the user, when capturing another pair of images.

According to still another embodiment, the step of determining a minimal exposure time that enables capturing images having a pre-defined TSNR value is based upon updated calculations of the TSNR metric and the image saturation metric.

In accordance with another embodiment, the method further comprises a step of determining at least one pre-defined Region of Interest (ROI), for which the calculations will be carried out.

According to another embodiment, the method further comprising a step of applying variance to mean ratio for carrying out TSNR estimation.

According to another embodiment, the method further comprising a step of applying spectral analysis for carrying out TSNR calculation.

According to another embodiment, the method further comprising a step of dividing a captured image into a plurality blocks, carrying out local TSNR calculation thereon, and based on the calculation of these local TSNR values, calculating a value for a global TSNR, preferably while removing local TSNR values associated with saturated blocks.

According to another embodiment, the method further comprising a step of calculating saturation metric including calculating thresholds and soft errors.

According to another embodiment, the method further comprising a step of implementing a control loop which combines both saturation and TSNR metric.

BRIEF DESCRIPTION OF THE DRAWINGS

For a more complete understanding of the present invention, reference is now made to the following detailed description taken in conjunction with the accompanying drawing wherein:

FIG. 3—demonstrates a division of a ROI into a plurality of blocks;

FIG. 4A demonstrates a selection of a normal circular filter while applying Discrete Fourier Transform (hereinafter: "DFT") for spectral approach TSNR calculation, whereas FIG. 4B demonstrates a selection of an inverse circular filter while applying DFT for spectral approach TSNR calculation;

FIG. 5A illustrates selection of a normal circular filter while applying Discrete Cosine Transform (hereinafter: "DCT") for spectral approach TSNR calculation, whereas FIG. 5B illustrates the selection of an inverse circular filter while applying DCT for spectral approach TSNR calculation;

DETAILED DESCRIPTION

Figure 1:
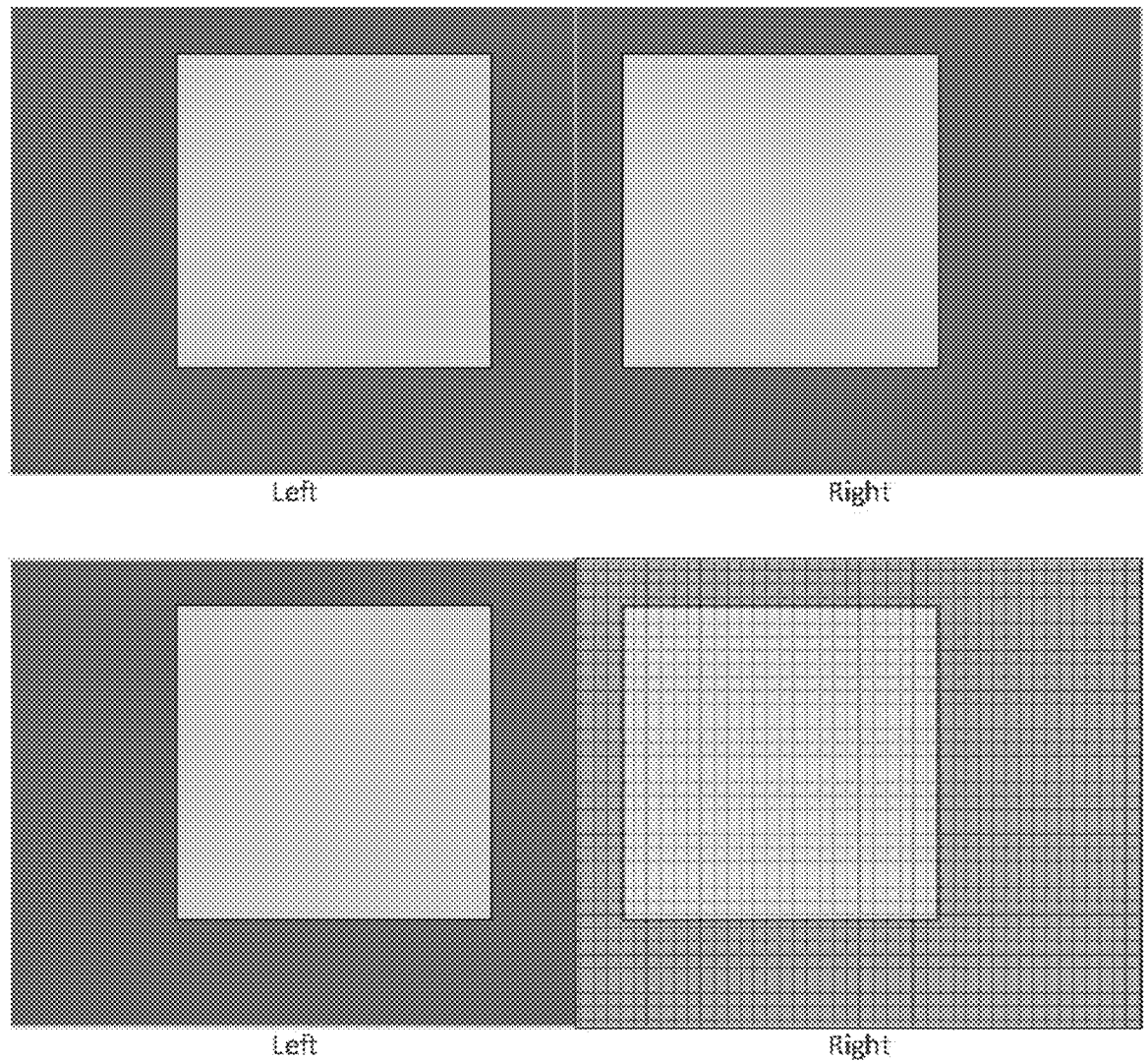
FIG. 1—exemplify analysis ROI: the top pair of figures illustrate an example of a left image and a right image, captured by a pair of image capturing devices, whereas the bottom pair of figures illustrate an example of defining the analysis ROI as an entire image of the image pair, here shown in the right image, signified as a semitransparent grid overlaying the right image.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

A stereoscopy system consists typically of two cameras (left and right) which capture images in a synchronized way, so that two images (i.e. frames) are captured essentially simultaneously.

The proposed autoexposure mechanism provided by the present disclosure relies on processing a stream of images (or image pairs or image trios, and the like) typically captured at a rate of few tens of images per second. After an image pair is captured, the present autoexposure mechanism uses this pair of images, alongside with state variables derived from earlier captured images, and calculates the exposure time period that will be implemented for the next time at which a pair of images will be captured.

According to the solution disclosed by the present invention, a texture-signal-to-noise ratio (hereinafter "TSNR") metric is provided. The TSNR is derived from a pair of images and is used as a predictor for the depth quality of that image pair. The metric is proportional to the image texture and inversely proportional to image noise. The metric is calculated for unsaturated regions so it increases monotonically along with the increase in the exposure duration.

A target value for TSNR may be selected by the user, and an automatic exposure control loop would be used to find the minimal exposure time period that would yield the target TSNR value, thereby minimizing power consumption and motion blur. The control loop may also limit over-exposures (i.e. saturations) according to user's specifications.

Preferably, the control loop relies on a parameters'-based algorithm and may be tuned to track changes due to cameras' motion or scene changes, yet while maintaining the depth image stability.

According to an embodiment of the disclosure, the solution provided is adapted for use by multiple viewing systems, using more than two cameras.

In accordance with another embodiment, the solution provided is adapted for use in systems with or without utilizing an active projected pattern.

Typically, the same exposure duration is used for both the left and right image sensors. However, this is not mandatory and separate autoexposure loops can be implemented for each one of the two image capturing sensors.

The method for obtaining an automatic exposure control according to an embodiment of the present invention comprises the following steps (per an image pair capture):
1. Calculating Texture Signal to Noise Ratio (TSNR) metric for the current image;
2. Calculating image saturation metric for the current image;
3. Updating an autoexposure control loop which takes into consideration both the TSNR and the saturation metrics;
4. Calculating the exposure time period for the next image capturing, by the control loop; and
5. Updating the newly calculated exposure time period for the sensor.

In the following description, the steps referred to hereinabove are described in further details.

State Variables

The following state variables are used for determining autoexposure:
ExposureCurrent: the exposure duration that was applied for capturing the current frame;
 Initial value: ExposureCurrent=ExposureInit (where ExposureInit is a parameter).
ExposurePrevious: the exposure time period that was used for capturing the previous frame,
 Initial value, ExposurePrevious=ExposureInit (where ExposureInit is a parameter).
TsnrCurrent: TSNR that is calculated for the current pair of images;
 Initial value: TsnrCurrent=0.
TsnrPrevious: TSNR that was calculated for the previous pair of images;
 Initial value: TsnrPrevious=0.
SlopeCurrent: TSNR-to-exposure slope, calculated for the current pair of images;
 Initiall value: SlopeCurrent=maxSlope where maxSlope is a parameter.
SlopePrevious: TSNR-to-exposure slope, calculated for the previous pair of images;
 Initial value: SlopePrevious=maxSlope where maxSlope is a parameter.

Region of Interest ("ROI") Analysis

In the example illustrated in FIG. 1, two images were captured: a left image and a right image. The analysis can be done either on the right image, on the left image or on both. Also, it can be carried out on any predefined Region of Interest (ROI) that is representative of the image. For example, a ROI for which the analysis may be carried out, could be defined so as to include only parts of the right image, parts of the left image, or parts that are common to both the right image and the left image. The rightmost margins are irrelevant for stereo matching and could be excluded from the analysis.

Figure 2:
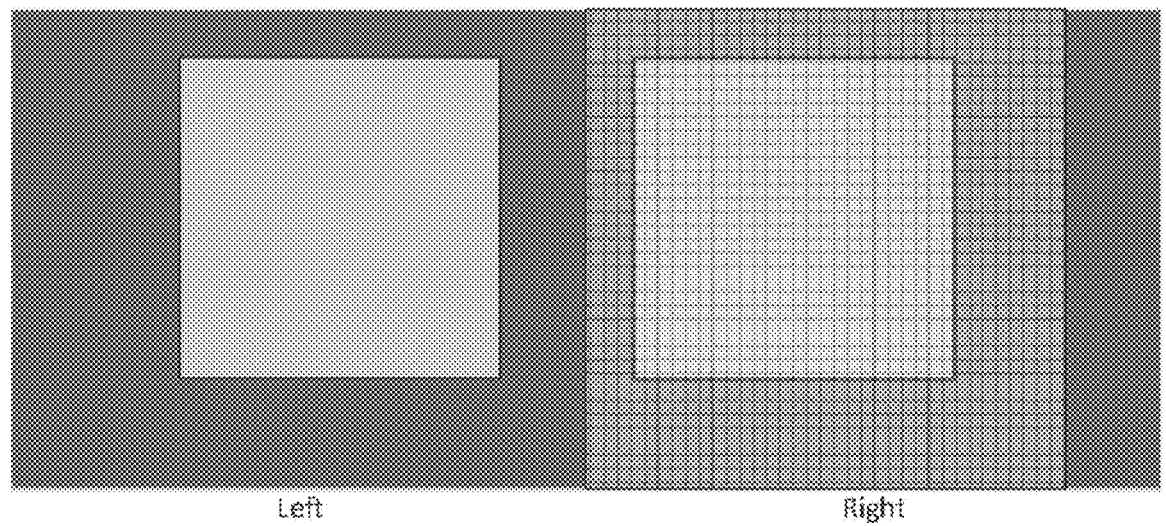
FIG. 2—exemplify ROI analysis: the top to bottom figures relate to the right image only, to a partial image of the right image and to multiple ROI's present at the right image.
Figure 2:
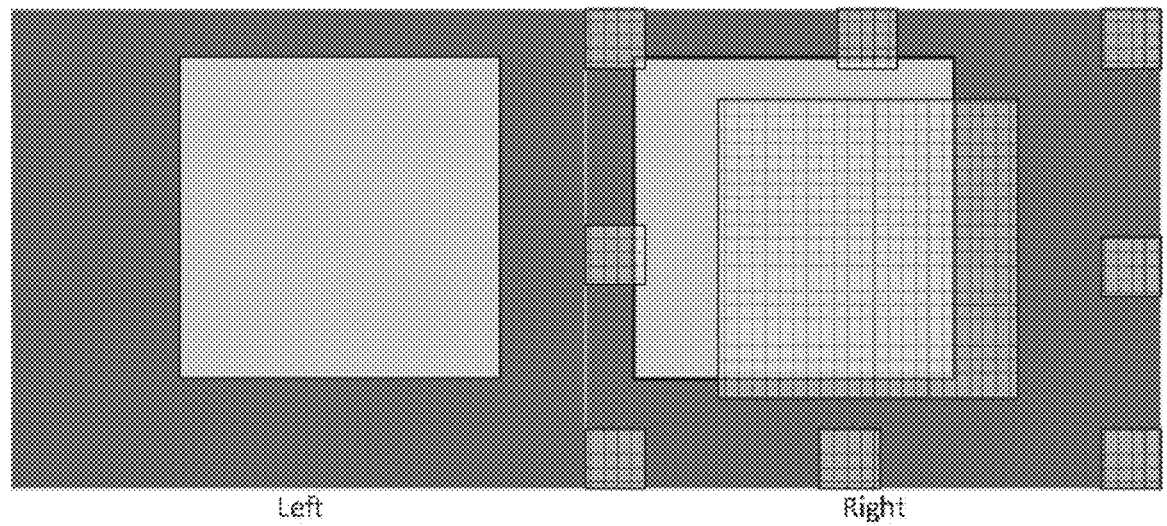

Another possibility is to use multiple ROIs and thus provide different representations per application. FIG. 2 presents some possible examples for the carrying out a ROI analysis.

TSNR Calculation

The following embodiment describes a number of steps associated with the TSNR calculation:
1) Dividing the ROI into a plurality of blocks:
 In this step, the ROI is divided into a plurality of blocks (as shown in FIG. 3), where the blocks' sizes may be configurable. A block can either overlap another block or non-overlap any other block.
2) Calculation of TSNR is carried out only on blocks which are not saturated (i.e. not overexposed).

The following calculation is carried out for each block:
(a) Counting saturated pixels:

$$N_{sat} = \text{Number of pixels with } P_{ij} > \text{TsnrBlockSatvalue}$$

Wherein:
$P_{ij}$ is the intensity level of the pixel located in row i and column j;
$\text{TsnrBlockSat}_{value}$ is a parameter which indicates the intensity level threshold for a pixel in order for that pixel to be considered as a saturated pixel during the TSNR calculation.

(b) block is considered to be a saturated block if:

$$\frac{N_{sat}}{N_{pixels\ per\ block}} > TsnrBlockSat_{th}$$

Wherein:
$\text{TsnrBlockSat}_{th}$ is a parameter which defines if a block is considered as a saturated block. If a block has more than $\text{TsnrBlockSat}_{th}$ [%] pixels, then it is considered to be a saturated block;
$N_{pixels\ per\ block}$—is the number of pixels that are present in a block;
$N_{valid}$ is a parameter used for counting valid (unsaturated) blocks:

$$N_{valid} = \text{Number of unsaturated blocks}$$

Local Texture-to-Noise-Ratio:
For each valid (unsaturated) block the Local TSNR is calculated. In accordance with different embodiments of the present disclosure, a number of algorithms may be applied in order to calculate the TSNR.

Variance to Mean Ratio $$M = \frac{1}{N_{pixels\ per\ block}} \sum_{i,j} P_{ij}$$

$$V = \frac{1}{N_{pixels\ per\ block}} \sum_{i,j} (P_{ij} - M)^2$$

$$TSNR_{block} = a \cdot \log_2\left(\frac{V}{M} + 1\right)$$

wherein:
$P_{ij}$—is the intensity of a pixel located at row i and column j; and
a—is a numeric parameter.

The rationale behind this method of TSNR calculation is that the variance (V) is correlated with the contrast (or texture level) of the block. A high variance indicates salient features that make better matching between pixels in the left and right images. The mean (M) is highly correlated with the noise energy since shot noise energy is proportional to the light intensity. Therefore, the ratio of variance to mean enables estimating the ratio of texture signal energy to noise energy.

The log function compresses the range of values that may be obtained. Using this log function is rather helpful in designing a control loop as will be further described. However, it should be appreciated by those skilled in the art, other monotonic functions may also be implemented instead of log function.

Spectral Approach

In case that a spectral approach is adopted, the spatial frequency components distribution of the image is calculated, followed by calculating the ratio between the energy of mid-range frequency components and the energy of high frequency components. The rationale behind this approach is that the relevant texture signal is mainly located in the mid-range frequencies (excluding the low frequency components which correspond to image intensity levels and are not related to the texture), while noise energy is uniformly distributed across all frequencies.

Moreover, there are several methods to calculate the spectral distribution of the image, in accordance with different embodiments of the disclosure. In the following description, Discrete Fourier Transform (hereinafter: "DFT") and Discrete Cosine Transform (hereinafter: "DCT") are used as examples of applicable transforms, but it should be understood that the same concept may be implemented using other spectral domain transforms as well.

TSNR with DFT

According to this embodiment, the following steps may be carried out in order to calculate the TSNR by implementing DFT.

1. Applying a Windowing Function:

In this step, each block is multiplied (element-wise) by a 2D Hanning function:

$$w(n, m) = \sin^2\left(\frac{\pi n}{N-1}\right)\sin^2\left(\frac{\pi m}{M-1}\right)$$

As will be appreciated by those knowledgeable in the art, other windowing functions may be used instead. The purpose of using the windowing function is to reduce discontinuities effects caused by the DFT periodic extension property.

2. Applying a DFT on Each Block:

$$X_{k1,k2} = \sum_{n_1=0}^{N_1-1}\sum_{n_2=0}^{N_2-1} x_{n1,n2} \cdot e^{-\frac{2\pi i}{N_2}k_2 n_2} \cdot e^{-\frac{2\pi i}{N_1}k_1 n_1}$$

3. Defining Filters for Use in the Spatial Frequency Domain:

FIGS. 4A and 4B demonstrate two examples of applying different filters for spatial frequency regions.

FIG. 4A demonstrates the use of a filter referred to herein as a "DFT normal circular filter" defined by two concentric circles having two radii, $r_1$ and $r_2$, which are centered around (0,0), the center of the spatial frequency plane. The 'low' region is defined to include the frequency bins that are comprised within the inner circle, the 'middle' region is defined to include the frequency bins residing between the two circles, whereas the 'high' region is defined as frequency bins that reside outside of the larger of the circles. The figure illustrates usage of the aforementioned filter, while applying DFT for spectral approach TSNR calculation. FIG. 4B demonstrates the use of a filter referred to herein as a "DFT inverse circular filter" defined by a circle of radius $r_1$ centered around (0,0), the center of the spatial frequency plane and four quarters of a circle of radius $r_2$ are positioned at the four extreme corners of the spatial frequency plain. The 'low' region is defined as the frequency bins comprised within the $r_1$ circle, the 'high' region is defined as the frequency bins which reside within the four quarters positioned at the corners of the plane, whereas the 'middle' region is defined as the complementary region located between the 'low' and 'high' regions. The figure illustrates the use of the aforementioned filter, while applying DFT for spectral approach TSNR calculation.

It should be noted that the filters are defined herein as binary masks, yet continuous transitions between regions are also possible.

4. Calculating TSNR for Frequency Regions:

$$\hat{S} = \frac{1}{N_{middle}}\sum_{middle\ region}|X|^2$$

$$\hat{N} = \frac{1}{N_{high}}\sum_{High\ region}|X|^2$$

$$T\hat{S}NR_{Block\ i} = a \cdot \log_2(\hat{S}/\hat{N} + 1)$$

wherein:

$N_{middle}$ and $N_{high}$—are the respective numbers of the elements (frequency bins) associated with each region; and a—is a numeric parameter.

It should be noted that the division by $N_{middle}$ and $N_{high}$ as depicted in the above equations, is applied in these equations in order to normalize the metric so it will not depend on the region size of the filter.

TSNR with DCT

Applying DCT can be a more efficient method for calculating the TSNR in some cases and the step of applying a windowing function may be skipped since properties of DCT create better boundary conditions for the respective block.

According to this embodiment, the following steps may be carried out in order to calculate the TSNR by implementing DCT.

1. Applying DCT on Each Block:

In the current example Type-II DCT is used. The selection of Type-II DCT in this case was made due to boundary condition properties of its periodic extension.

$$X_{k1,k2} = \sum_{n_1=0}^{N_1-1}\sum_{n_2=0}^{N_2-1} x_{n1,n2} \cdot \cos\left[\frac{\pi}{N_1}\left(n_1+\frac{1}{2}\right)k_1\right] \cdot \cos\left[\frac{\pi}{N_2}\left(n_2+\frac{1}{2}\right)k_2\right]$$

Obviously, using other DCT types with or without a windowing stage is also possible.

2. Defining Filters for Use in the Spatial Frequency Domain:

FIGS. 5A and 5B illustrate two examples of applying different filters for spatial frequency regions.

FIG. 5A illustrates the use of a filter referred to herein as a "DCT normal circular filter" defined by two quarters of circles of radii $r_1$ and $r_2$, whose center are at (0,0) of the frequency plane positioned at the top-left corner. The 'low' region is defined as frequency bins within the $r_1$ quarter circle, the 'middle' region is defined as the frequency bins between the $r_1$ quarter circle and the $r_2$ quarter circle, and the 'high' region is defined as the frequency bins outside the $r_2$ quarter circle. The figure illustrates the use of the aforementioned filter while applying DCT for spectral approach TSNR calculation.

FIG. 5B illustrates the use of a filter referred to herein as a "DCT inverse circular filter" defined by a quarter of a circle of radius $r_1$ whose center is at (0,0) of the frequency plain at the top-left corner and a quarter of a circle of radius $r_2$ whose center is at the bottom-right corner of the frequency plain. The 'low' region is defined as frequency bins within the $r_1$ quarter circle, the 'middle' region is defined as the frequency bins between the $r_1$ quarter circle and the $r_2$ quarter circle, and the 'high' region is defined as the frequency bins within the $r_2$ quarter circle. The figure illustrates the use of the aforementioned filter while applying DCT for spectral approach TSNR calculation.

As in the DFT example, it should also be noted here that the filters are defined as binary masks, yet continuous transitions between regions are also possible.

3. Calculating TSNR for Frequency Regions:

$$\hat{S} = \frac{1}{N_{middle}} \sum_{middle\ region} |X|^2$$

$$\hat{N} = \frac{1}{N_{high}} \sum_{High\ region} |X|^2$$

$$T\hat{SN}R_{Block\ i} = a \cdot \log_2(\hat{S}/\hat{N} + 1)$$

$N_{middle}$ and $N_{high}$—are the respective numbers of the elements (frequency bins) associated with each region; and
a—is a numeric parameter.

It should be noted that the division by $N_{middle}$ and $N_{high}$ as depicted in the above equations, is applied in these equations in order to normalize the metric so it will not depend on the region size of the filter.

Global Texture to Noise Ratio

Next, First the $T_{snr}P_{revious}$ state variable is update by changing its value to the current value:

TsnrPrevious=TsnrCurrent

The $T_{snr}C_{urrent}$ state variable may be updated from the block TSNR values. Preferably, one may use the $k^{th}$ worst block (i.e. the block associated with the $k^{th}$ worst TSNR) and use the TSNR of that block as the TSNR of the image.

$$TsnrCurrent = \begin{cases} k^{th}\ \text{order statistic from block}\ TSNR\ \text{series} & N_{valid} \geq k \\ N_{valid}\ \text{order statistic from block}\ TSNR\ \text{values} & 0 < N_{valid} < k \\ 0 & N_{valid} = 0 \end{cases}$$

wherein:
$N_{valid}$ is the number of unsaturated blocks;
k is a numeric parameter; and
$K^{th}$ order statistic is the $K^{th}$ minimum ($K^{th}$ element from the sorted list of block TSNR's values).

If $N_{valid}$=0, the $T_{snr}C_{urrent}$ is defined as 0, for the sake of definition completeness.

This method provides better results than if a percentile of the distribution of TSNR values were to be used.

Figure 6:
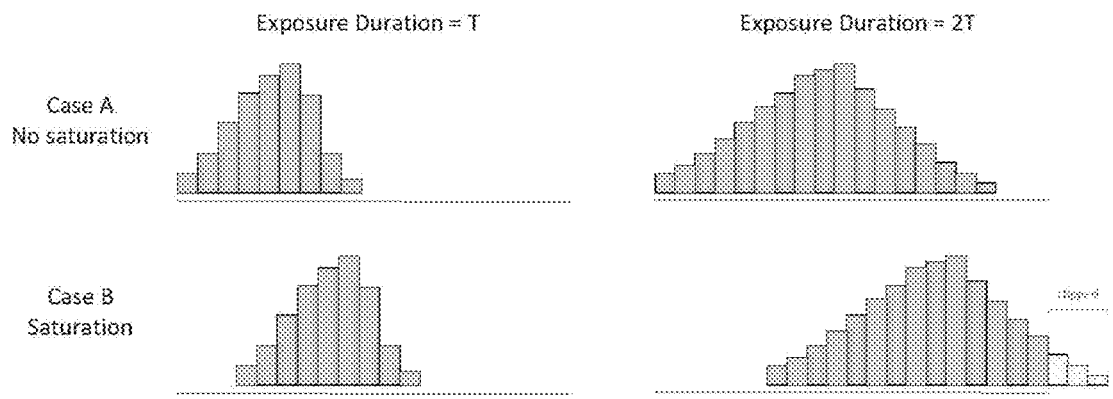
FIG. 6 presents histograms of TSNR block values.

In general, as the exposure duration (i.e. period of time) increases, the histogram of TSNR block values distribution expands and a certain percentile of TSNR values (e.g. 20%) monotonically increases with the exposure duration. However, as the exposure duration increases, more blocks would be excluded due to their saturation and the number of valid (unsaturated) blocks will decrease. As demonstrated at the top part of FIG. 6, present case A where there is no saturation, the TSNR histograms for exposure times T and 2*T are similar in shape and differ only in their width. However, in case B which is demonstrated at the bottom part of FIG. 6, the TSNR histograms for exposure time T and 2*T are different, due to the removal of the saturated blocks for exposure time 2*T.

A percentile value might no longer be monotonically increasing as its relative location in the distribution is lower.

Using the $k^{th}$ minimum ensures monotonicity, until $N_{valid}$<k. However, as the allowed saturation in an image is typically kept low enough, that case is unlikely to be reached.

Figure 7:
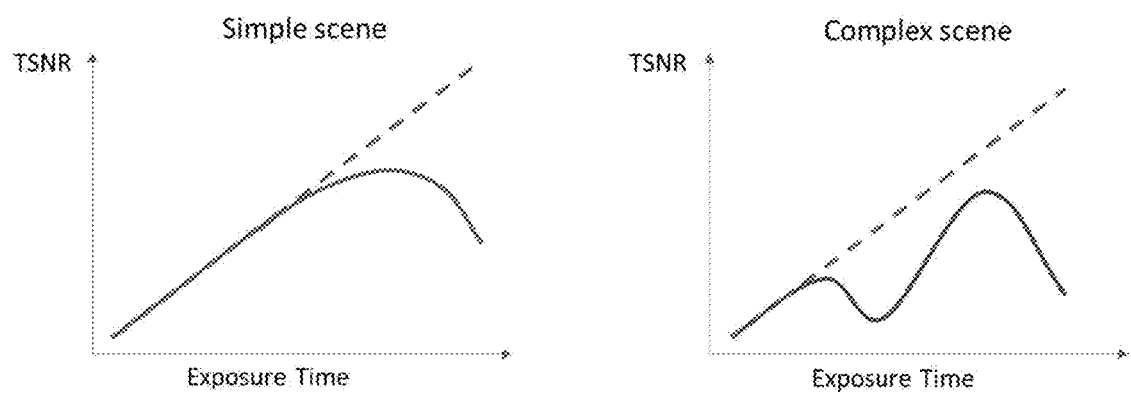
FIG. 7 presents two graphs of TSNR vs. exposure time obtained for two different cases.

FIG. 7 illustrates how the removal of saturated blocks from the TSNR calculation achieves a monotonically increasing TSNR behavior. The figure shows images of TSNR as a function of exposure duration. while the monotonous dotted line is the result of excluding saturated blocks. The left part of this figure relates to a simple scene, for example a wall which is parallel to a camera system. The solid line relates to a case where block saturation is not being taken care of, and as the graph shows, TSNR increases as a function of the exposure time period. When the value of the exposure time period exceeds a certain level, image blocks become saturated, texture reduces while noise is less affected, and as a result—TSNR decreases. A control loop designed for a monotonous behavior described by the dotted line, corresponding to saturated block removal, is substantially simpler.

The right part of FIG. 7 describes a complex scene, such as a room with several objects at various distances. In this case, there are several regions of the image which become saturated for different levels of exposure time. The solid curve has local maxima and is therefore difficult to base a control loop thereupon, whereas the dotted line which corresponds to saturated block removal, is simpler to control.

Calculation of Image Saturation Metric

There are two parameters that may be used for calculating the saturation metric, namely:

imageSatValue: which defines an intensity level above which the pixel is considered as a saturated pixel.

ImageSaturationLimit: an image is considered saturated if the percentage of saturated pixels out of the total number of pixels comprised within the entire image is higher than the value of ImageSaturationLimit.

In this example, a histogram of pixel intensities is calculated first for the entire ROI. The histogram provides the number of pixels for each intensity level, GL.

$H_{GL}(GL)$=Histogram of intensity levels of the image

Next, the value of SatIndex that will be used later in the saturation prediction process, is found. SatIndex is the intensity level, for which there are ImageSaturationLimit[%] pixels that have the same intensity level or higher. For example, if ImageSaturationLimit=20% (allowing the image to be 20% saturated), then SatIndex is the intensity level for which 20% of the pixels have intensity of SatIndex or above.

SatIndex may be found by summing the $H_{GL}$ histogram bins from the highest value to the lowest and stopping when the sum equals ImageSaturationLimit $$\frac{1}{N_{pixels}} \cdot \sum_{n=GLMAX}^{downto\ SatIndex} H_{GL}(n) = ImageSaturationLimit$$

wherein
SatIndex is the histogram's bin index; and
GLMAX is the maximum possible intensity level. For example, for an 8 bits representation, GLMAX equals to 255.

Control Loop

Following is an example demonstrating implementation of an effective control loop, where the following calculations may be carried out:

(i) Slope Calculations (Exposure-to-TSNR)

For carrying out the slope calculations, the following parameters are preferably used:
MinSlope, MaxSlope: limits for the allowed slope value;
minExposureDifference: minimal absolute difference between previous and current exposure time periods, below which the slope will not be updated;
minTSNRDifference: minimal absolute difference between previous and current Tsnr values, below which the slope will not be updated; and
SlopeWeight: slope memory weight factor.
Now, let us define the following:

$$\Delta Exposure = ExposureCurrent - ExposurePrevious$$

$$\Delta TSNR = TsnrCurrent - TsnrPrevious$$

Next, the value of the state variable is updated for the previous Slope:

$$SlopePrevious = SlopeCurrent$$

One may then continue to calculate the current slope as follows:

If ($|\Delta Exposure| > MinExposureDifference$; and $|\Delta TSNR| > MinTsnrDifference$), then $$Slope = SlopePrevious \cdot (1 - SlopeWeight) + SlopeWeight \cdot \frac{\Delta TSNR}{\Delta Exposure}$$

$$SlopeCurrent = \begin{cases} MaxSlope & Slope > MaxSlope \\ MinSlope & Slope < MinSlope \\ Slope & otherwise \end{cases}$$

otherwise, the slope would not be updated, and $$SlopeCurrent = SlopePrevious$$

In other words, the slope value is updated only if the values of both the exposure and TSNR have changed between the previous iteration made and the current iteration. This ensures that the slope value is not updated in cases which could lead to erroneous slope values. For example, if the exposure time period is limited to its minimal or maximal values, the previous and current exposure time periods are equal to the exposure limit value and the slope calculation is invalid. Another example is when the control loop is stabilized, very small exposure corrections are made, and TSNR changes might be attributed to noise.

(ii) Exposure Calculation

For carrying out the exposure time calculations, let us first calculate the saturation limited exposure in the following way:

$$SatLimitedExposure = ExposureCurrent \cdot \frac{ImageSatValue}{SatIndex} \cdot SatLimitedExposureFactor$$

ImageSatValue is a parameter defined as the intensity level above which the pixel is considered as a saturated pixel.

SatLimitedExposureFactor is a numeric parameter which is equal to 1 when 100% of the limited exposure is used. A lower value of this parameter (e.g. 0.8) will be a more conservative value and would limit the exposure to 80% of the saturation limited exposure.

TSNR calculation is based on $N_{valid}$ non-saturated blocks. In case of a complete or a nearly complete saturation, it is possible that $N_{valid}$ will have a very small value, or even be equal to 0, in which case, the TSNR value cannot be calculated reliably.

It is therefore preferred that the parameters are selected so that the image saturation exceeds the image saturation limit before the value of $N_{valid}$ becomes too small for TSNR reliable calculation, otherwise, Psat and TSNR error Weight, are preferably calculated.

Psat is a parameter that has a numeric value in the range of between 0 and 1, which represents the extent of the image saturation.

TSNR error Weight—is the weight given to TSNR error in the calculation of the updated exposure duration.

If the image saturation exceeds the allowed limit, Psat receives a value between 0 and 1 that contributes to lowering the exposure. TSNR error Weight is then set to 0. In that case, the exposure update will be only in accordance with the saturation error.

If the image saturation is below the allowed limit and $N_{valid}$ is too small for reliable TSNR calculation, Psat is set to 1 and TSNR error Weight is set to 0. This will confirm that the exposure will be lowered until these conditions are no longer relevant.

If the image saturation is below the allowed limit and $N_{valid}$ is high enough, Psat is set to 0 and TSNR error Weight is set to 1. In this case, the exposure update will be affected only according to the TSNR error.

The calculation may be carried out as follows:

If SatIndex ≥ ImageSatValue $$Psat = \frac{SatIndex - ImageSatValue}{GLMAX - ImageSatValue}$$

TSNR error Weight=0
Else
  If $N_{valid}$ < MinimalRequiredBlocks
    TSNR error Weight=0
    Psat=1
  else
    Psat=0
    TSNR error Weight = 1.

MinimalRequiredBlocks is a parameter representing the minimal number of valid (unsaturated) blocks required for calculating a reliable TSNR value.

When the value of the parameter TSNR error Weight=0, the control loop acts only to minimize saturation and ignores the TSNR. This mode of operation is useful for reducing the number of steps required to depart from the state of saturation.

The calculation of the saturation term, may be done as follows:

SaturationTerm=psat–PsatFactor wherein PsatFactor is a parameter, and the way to calculate Psat, which represents the extent of the image saturation and has a value between 0 and 1, was exemplified above.

The state variable for the previous exposure duration is then updated by applying:

ExposurePrevious=ExposureCurrent and the current exposure state variable may be updated by applying:

$$TsnrError = (TsnrTarget - TsnrCurrent) \cdot TSNR \text{ error Weight}$$

$$Exposure = ExposureCurrent + gradientFactor \cdot \frac{TsnrError}{SlopeCurrent} - SaturationTerm$$

whereas the current exposure will be updated in accordance with the limits set therefor:

$$ExposureCurrent = \begin{cases} Min(MaxExposure, SatLimitExposure) & \begin{array}{l} Exposure > MaxExposure \\ \text{or} \\ Exposure > SatLimitExposure \end{array} \\ MinExposure & Exposure < MinExposure \\ Exposure & \text{otherwise} \end{cases}$$

wherein
  GradientFactor—is a parameter being a factor for the exposure change along the slope. It sets a tradeoff between the responsivity and the stability of the control loop; and
  MinExposure, MaxExposure—are the exposure limits.
(iii) Updating the Sensor with the New Exposure Duration Value The imaging sensor may be updated by applying the newly calculated exposure duration: ExposureCurrent.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different objects, not all of which are required in all embodiments of the invention. Some embodiments of the present invention utilize only some of the objects or possible combinations of the objects. Variations of embodiments of the present invention that are described and embodiments of the present invention comprising different combinations of features noted in the described embodiments will occur to persons of the art. The scope of the invention is limited only by the following claims.

The invention claimed is:

1. A stereoscopic apparatus configured to determine duration of an exposure time period for capturing images by said stereoscopic apparatus and comprising:
  at least one image capturing device configured to capture pairs of images;
  one or more processors configured to:
    calculate a texture-signal-to-noise ratio (TSNR) metric based on information derived from at least one image belonging to a pair of captured images, wherein the TSNR metric is proportional to texture of the at least one image of the pair of captured images and inversely proportional to a noise associated with said at least one image, and wherein the TSNR metric is calculated based on unsaturated pixels that belong to said at least one image;
    calculate an image saturation metric based on said at least one image of said pair of captured images;
    calculate one or more values for an exposure time period that will be implemented by the at least one image capturing device when at least one other image is captured;
    provide the calculated value of exposure time period to each of the at least one image capturing device; and
  wherein said at least one image capturing device is configured to capture at least one other image, while each implementing the respective calculated value of exposure time period provided to the corresponding one of the at least one image capturing device.

2. The stereoscopic apparatus according to claim 1, further comprising an automatic exposure control loop configured to affect a minimal exposure time period that enables capturing images having a pre-defined TSNR value.

3. The stereoscopic apparatus according to claim 2, further comprising a user interface configured to receive an indication regarding the pre-defined TSNR value as selected by a user;
  wherein said at least one processor is further configured to calculate a value for a minimal exposure time period that would yield said pre-defined TSNR value and provide the value of the minimal exposure time period to said automatic exposure control loop; and
  wherein said automatic exposure control loop is configured to implement said calculated minimal exposure time period that meets the pre-defined TSNR value as selected by the user.

4. The stereoscopic apparatus according to claim 3, wherein said automatic exposure control loop is further configured to enable tracking changes occurring due to a movement of said stereoscopic apparatus or due to changes in the scene, while maintaining depth image stability.

5. The stereoscopic apparatus according to claim 2, wherein said at least one processor is configured to provide the auto exposure control loop with updated information that is based upon updated calculations of said TSNR metric and said image saturation metric.

6. The stereoscopic apparatus according to claim 1, wherein said at least one processor is configured to determine at least one predefined Region of Interest (ROI), for which the at least one processor's calculation be carried out.

7. A method for determining an exposure time period for capturing images by a stereoscopic apparatus that comprises at least one image capturing device configured to capture pairs of images, said method comprises the steps:
   calculating a texture-signal-to-noise ratio (TSNR) metric based on information derived from at least one image belonging to a pair of captured images, wherein the TSNR metric is proportional to texture of at least one image from among the pair of captured images and inversely proportional to a noise associated with said at least one image, and wherein the TSNR metric is calculated based on unsaturated pixels that belong to said at least one image;
   calculating an image saturation metric based on the at least one image;
   calculating one or more values of an exposure time period that will be implemented by the at least one image capturing device when at least one other image will be captured;
   providing the calculated value of the exposure time period to each of the at least one image capturing device; and
   capturing at least one other image by said at least one image capturing device, while the at least one image capturing device implements the respective calculated value of the time exposure period provided to the corresponding one of the at least one image capturing device.

8. The method according to claim 7, further comprising a step of determining a minimal exposure time period that enables capturing images having a pre-defined TSNR value.

9. The method according to claim 8, further comprising the steps of:
   receiving an indication from a user regarding a selected pre-defined TSNR value;
   calculating a minimal exposure time period that would yield said pre-defined TSNR value; and
   implementing said calculated minimal exposure time period that meets the pre-defined TSNR value as selected by the user, when taking another pair of images.

10. The method according to claim 8, wherein said step of determining a minimal exposure time period that enables capturing images having a pre-defined TSNR value based upon updated calculations of said TSNR metric and said image saturation metric.

11. The method according to claim 7, further comprising a step of determining at least one predefined Region of Interest (ROI), on which said calculations will be carried out.

* * * * *